Oct. 6, 1964   W. R. CULLEN ETAL   3,151,442
MOTORIZED TIME GLASS
Filed May 23, 1962   2 Sheets-Sheet 1
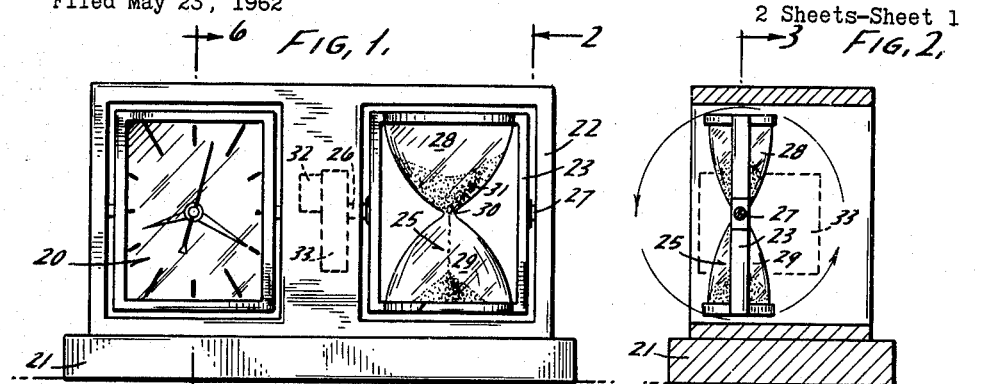
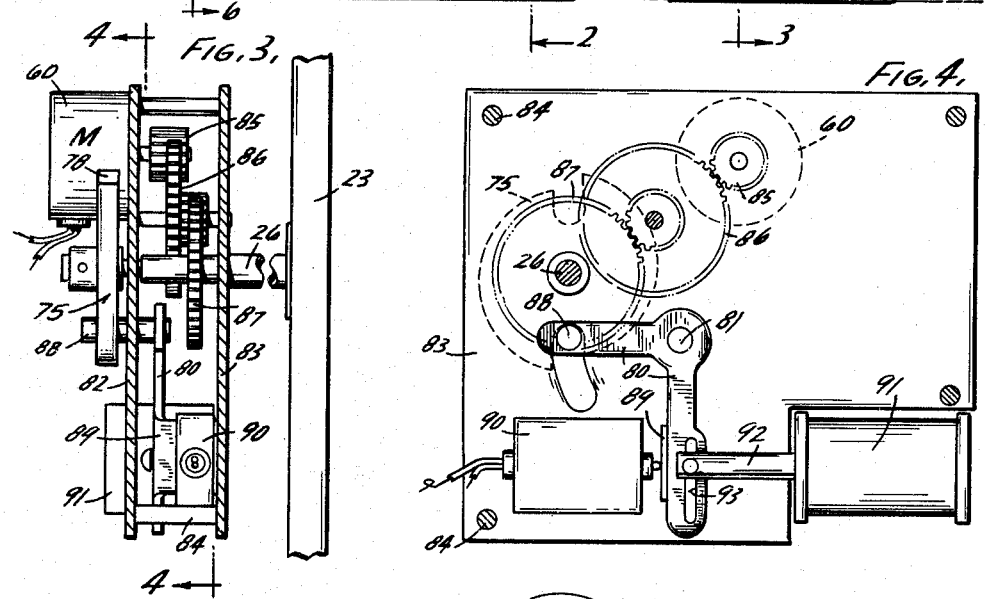
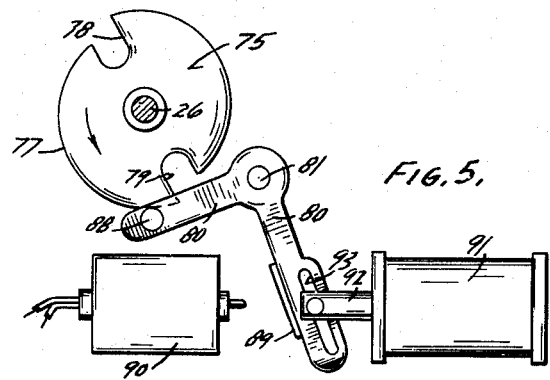
INVENTORS
WILLARD RUSH CULLEN
BY  DALE R. MILNE
Wheeler, Wheeler and Wheeler
ATTORNEYS.

Oct. 6, 1964
W. R. CULLEN ETAL
3,151,442
MOTORIZED TIME GLASS
Filed May 23, 1962
2 Sheets-Sheet 2
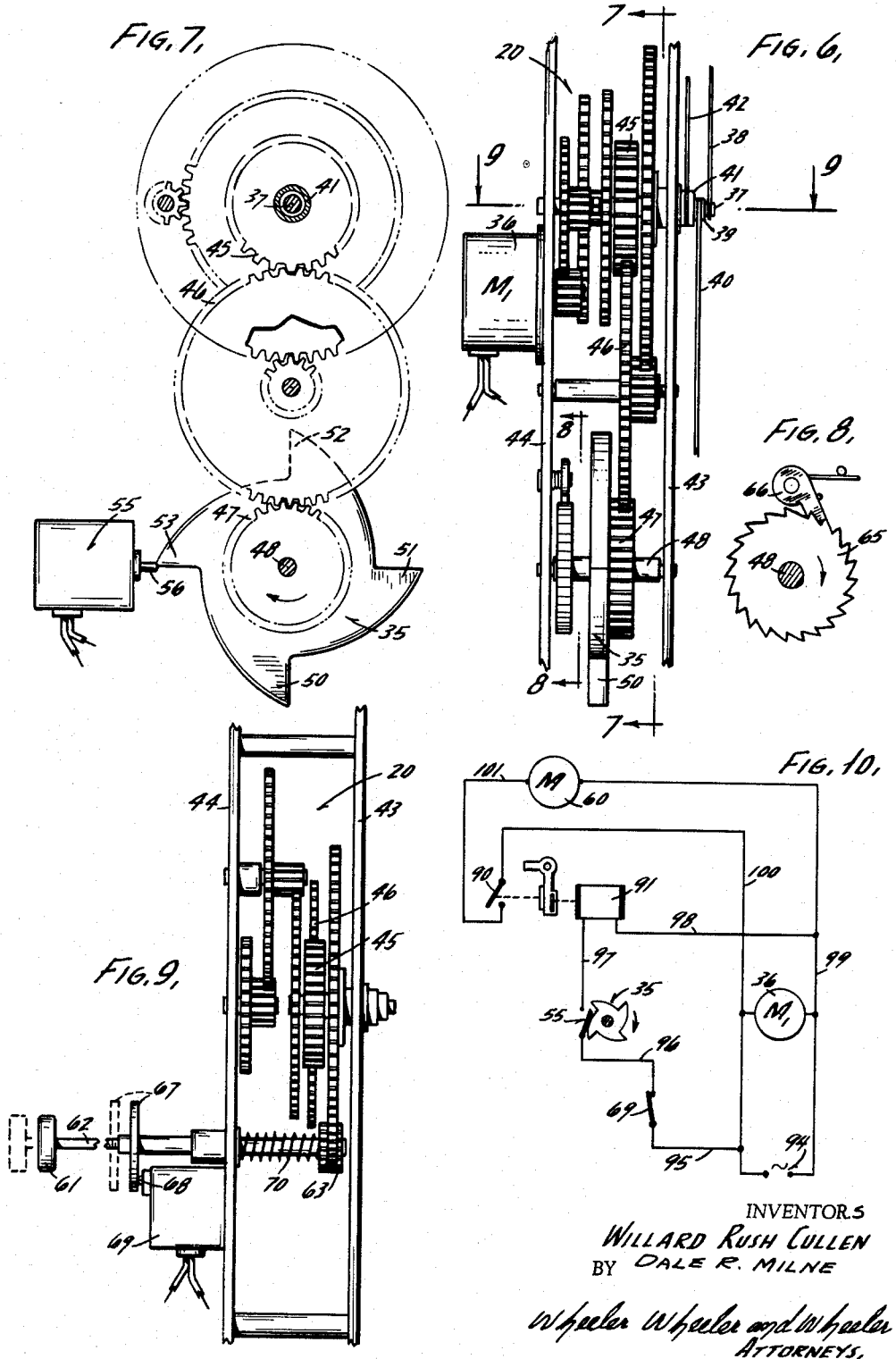
INVENTORS
WILLARD RUSH CULLEN
BY DALE R. MILNE
Wheeler Wheeler and Wheeler
ATTORNEYS.

United States Patent Office 3,151,442
Patented Oct. 6, 1964

3,151,442
MOTORIZED TIME GLASS
Willard Rush Cullen, 214 Racine St., Delavan, Wis., and Dale R. Milne, Delavan, Wis.; said Milne assignor to said Cullen
Filed May 23, 1962, Ser. No. 197,059
7 Claims. (Cl. 58—144)

The instrument identified in the dictionary as an "hour glass" is defined there as an instrument for measuring time, especially the interval of an hour, but since the devices encompassed within this invention relate to instruments similar to an hour glass but which may demonstrably indicate the elapse of a period of time of fifteen minutes, or of three minutes, or any other predetermined interval, a broader term "time glass," is herein used. It will be understood that material other than glass, for instance plastic, is included within this terminology.

Furthermore, there is herein included within the term "time glass" any arrangement of connected chambers or containers so that substances such as sand, liquid or other tricklable material may pass from one chamber or container to another to provide visible demonstration of elapsed time and, by change of relative position of the containers, the demonstration may be repeated. It is to the connection of such a time glass with a horological instrument whereby the change in relative position of the chambers may be controlled or motivated that this invention relates. Thus the time glass may be repeatedly reset to repeat the demonstration. This resetting will be termed a "regeneration" of the time glass.

This invention relates to a motorized time glass. More particularly stated, the invention relates to the motivation of a time glass, whereby the interval of time visually portrayed by such a glass may be repeatedly and automatically demonstrated.

Another feature of the invention relates to the chronometric control of the regeneration of a time glass by interrelating the time glass and a timed mechanism so that the time glass is inverted, or moved to a regenerative position by action of the mechanism.

Furthermore, the invention relates to the automatic timed regeneration of a time glass whereby the regeneration takes place immediately after the exhaustion of the sand or other "trickle medium" from its "upper" chamber.

In the drawings:

FIG. 1 is a front elevation of a combination clock and time glass showing somewhat diagrammatically an illustrative physical relationship of a horological instrument and a time glass.

FIG. 2 is a section on line 2—2 of FIG. 1.

FIG. 3 is a section on line 3—3 of FIG. 2.

FIG. 4 is a section on line 4—4 of FIG. 3 showing a locking device, and interrelated switch to control a holding circuit, whereby the time glass is positively held in position for a timed demonstration.

FIG. 5 is a fragmentary view of some of the parts shown in FIG. 4, position of such parts being that which they assume shortly after the commencement of a regenerative inversion of a time glass.

FIG. 6 is a vertical section through a motorized horological instrument, equipped with control devices in accord with this invention.

FIG. 7 is a section on line 7—7 of FIG. 6.

FIG. 8 is a section on line 8—8 of FIG. 6.

FIG. 9 is a horizontal section on line 9—9 of FIG. 6.

FIG. 10 is a wiring diagram showing the electrical connections between the principal operating elements of the horological instrument-time glass combination.

As an illustration of the general relationship of a horological instrument and a time glass in accord with this invention, FIG. 1 shows a somewhat conventional electric clock 20 mounted at one end of a base 21. At the other end of the base 21, there is an upstanding frame 22 with means for successive regenerative movement of the time glass including an inset time glass frame 23 supporting a time glass 25. The time glass frame 23 is mounted in the frame 22 by means of regenerator shaft 26 and corresponding aligned trunnion 27 so that as indicated by the arrows in FIG. 2, the time glass can be inverted, or as above indicated, the time glass may be regenerated. By this it is meant thta the time glass comprising a chamber 28 and a chamber 29 connected by the usual trickle aperture tube 30 may be filled with a predetermined quantity of sand 31 or other material tricklable through aperture 30, and when the sand has trickled into the particular chamber which is in lowermost position, may be regenerated by inversion of the time glass so as to bring the "filled" chamber into uppermost position. Thus the time glass is in readiness for another demonstration of the particular amount of elapsed time represented by the selected amount of sand.

In the description to follow, a demonstrable time period of fifteen minutes is selected as illustrative. Diagrammatically in FIGS. 1 and 2, an electric motor in the position indicated in dotted lines at 32 is mechanically connected by suitable gearing and controls at 33 to move shaft 26 rotatably for inversion of the time glass as will be described below.

To provide a readily understandable generalization of the principal control and operating devices now to be described, it is here explained that the horological instrument shown in FIGS. 6 to 9 inclusive is relied upon to give a timed control of a master cam 35 which determines the commencement of a regenerative 180 degree change of rotative position of shaft 26. The apparatus shown in FIGS. 2 to 5 inclusive comprises separately motorized means not only to lock and unlock shaft 26, but also to rotate this shaft from one locked position through a time glass regenerative inversion to another locked position, The horological instrument shown in FIG. 6 includes the usual synchronous electric motor 36 which drives a train of gears culminating in the usual sweep second hand shaft 37 with sweep second hand 38, minute arbor 39 with minute hand 40 and the hour shaft 41 with hour hand 42. But in addition and mounted to the same frame plates 43 and 44 which support the movement train of gears, there is added to the horological instrument 20 a train of gears shown in FIG. 7 which carries the rotative movement energized by clock 36 through a power take-off gear 45, a transfer gear 46 to cam gear 47. This gear 47 is mounted upon the same shaft 48 which carries master control means cam 35.

Since master control means cam 35 in this illustrative disclosure of the invention is to control regeneration of time glass 25 every fifteen minutes, and the shaft 48 revolves once each hour in accord with the once an hour rotation of gear 45 on arbor 41, there are four lobes 50, 51, 52 and 53 on the master cam. Facing the edge of this plate-like master cam is a normally opened switch 55, the actuator 56 of which is so positioned with respect to the cam lobes of master cam 35 that the switch is closed in the last fifteen degrees of movement of the master cam prior to the drop-off of the actuator 56 respecting the particular lobe which has just acted upon it. For instance, just as the sand is running out of the particular chamber 28 or 29, one of the cam lobes will be rotated by the horologic instrument against switch actuator 56 and the closing of the switch 55 will institute regenerative movement of shaft 26.

As will become apparent from the description below, a device is needed respecting the horological instrument to prevent shaft 48 from rotating in the reverse direction from that indicated in FIG. 8. Such reverse direction might otherwise take place when a setting of the hands 40, 42 is accomplished by the usual setting apparatus shown in FIG. 9. Furthermore, means are needed to open the master control circuit of motor 60 during a hand setting operation. As shown in FIG. 9, the hand setting knob 61 of the horological instrument 20 includes the usual hand setting stem 62 equipped with a hand setting pinion 63 which, in this case, is shown in full lines in extendable position. When the hands are to be set, setting knob 61 and setting stem 62 are pulled to the left as shown in FIG. 9, and pinion 63 is then engaged with gear 46 forming part of the gear train for driving the hands 40, 42. Such hand setting equipment is provided with friction drives (not shown) which permit the setting of the hands without movement of some of the gears of the gear train, and provision is made as shown in FIG. 8 to prevent rotation of shaft 48 by supplying a ratchet 65 and pawl 66 to assure movement of shaft 48 only in the direction indicated by the arrow in FIG. 8.

At the same time that the setting knob 61 is pulled to the dotted line position shown in FIG. 9 for hand setting purposes, the stem 62 provided with switch plate 67 is pulled away from the safety switch actuator 68 with the result that switch 69, provided with switch actuator 68, is automatically opened; whereas in the standby position of the parts in FIG. 9 as shown in full lines, safety switch 69 is closed. This is assured by the action of the compression spring 70 which bears between plate 44 and pinion 63 to thrust pinion 63 to the right as seen in that view, and thus, for instance, no reverse direction of movement of the master cam 35 against actuator 56 is possible.

Reference has already been made to the fact that locking means are provided to prevent rotative movement of shaft 26 during the time interval when the tricklable substance in the upper chamber is passing downward through the aperture 30 into the lower chamber of the time glass. Fixed upon the shaft 26 is plate-like interlock cam 75, the peripheral margins of which provide two cam surfaces 76 and 77, respectively, between two diametrically opposite interlock recesses 78 and 79. Interlocking lever 80, of bell crank configuration, is pivotally mounted to a stub pin 81 carried by frame plate 82. This frame plate has its companion frame plate 83 to form, with posts 84, a frame for a gear mechanism motivated by the small electric motor 60. This motor 60 and the gear train driven thereby as shown at 85, 86 and 87 rotate the shaft 26 upon which the interlocking cam 75 is fixed, provided that interlocking lug 88 carried by arm 80 is not in one of the recesses 78 or 79. If the lug 88 is in one of the recesses as shown in FIG. 4, then interlock contact plate 89 bears against the actuator of switch 90 which is inherently biased to closed position but which, in the position shown in FIG. 4, has its actuator thrust inwardly of the switch to open it.

Interlock solenoid control device 91 has its armature shaft 92 slidably interlocked with interlock 80 as shown at 93, and when the solenoid is energized, the armature is pulled into the solenoid so as to withdraw interlock lug 88 from the particular recess 78 or 79 into which it is biased by a spring (not shown) within the solenoid.

Now referring to the wiring diagram shown in FIG. 10 and assuming that the position of the master cam 35 is as shown in FIG. 7, the cycle of operations is as follows: Shortly before the master cam reaches the position shown in FIG. 7, lobe 53 of master cam 35 had thrust the actuator 56 of switch 55 to the left to close the switch. A source of current at 94 will then supply an electric potential through safety lead 95, safety switch 69 and master cam lead 96, through the switch 55 to solenoid lead 97 and to solenoid 91. Solenoid lead 98 is connected to a return, or ground lead 99. Immediately upon the energization of solenoid 91 in this manner, interlock arm 80 is pulled to the position shown in FIG. 5 and lug 88 is withdrawn from the particular recess which it has occupied in interlocking cam 75. Simultaneously the interlock contact plate has been withdrawn from the normally closed switch 90, thus completing a circuit through motor 60 which includes motor lead 100, a switch 90 and motor lead 101. When energized, the motor 60 rotates gearing 85, 86 and 87 whereby to rotate shaft 26 upon which gear 87 is fixed. This immediately brings the high point of cam surface 76 or cam surface 77 in position to prevent the return of the lug 88 to the recess from which it has just been withdrawn. As a result, plate 89 cannot return immediately to open switch 90 and the motor 60 will continue to rotate the gearing and continue to move shaft 26 through 180 degrees of rotation until lug 88 drops into the next recess 78 or 79.

In the meantime, the horological instrument 20 has moved the master cam so that actuator 56 drops off of the high point of the particular master cam lobe, and solenoid 91 is deenergized because of the opening of switch 55.

Upon the dropping of lug 88 into a recess in interlock cam 75, the regeneration of the time glass has been completed, the tricklable material which was in the lowermost chamber at the time of commencement of this cycle of operations is now in the uppermost position and is entering upon its fifteen minute demonstration of fifteen minutes of elapsed time. With the exception of the operation of the horological instrument 20, all of the parts remain at rest until the next lobe of master cam 35 causes the switch 55 to close. Of course, for operation of the motor 36, a direct connection between lead 100 and lead 99 as shown in FIG. 10 provides for constant energization and drive of and by this motor.

It will be understood that if the time glass 25 is provided with aperture 30 and a quantity of tricklable material 31 predetermined for three minutes of operation, then the master cam 35 would be provided with cam lobes so spaced peripherally of the master cam 35 as to regenerate such a short period time glass as often in the hour as may be desired.

It will be clear from the above description that the mechanism shown in FIGS. 2, 3, 4 and 5, in conjunction with portions of the electric circuit shown in FIG. 10 related to leads 97 and 98 may be extended to any reasonable distance from the horological instrument 20, but it has been found that the presence even close by the horological instrument 20 of a timed demonstration device such as a time glass is of great assistance in timing telephone calls and other practices requiring some demonstration of a period of elapsed time.

We claim:

1. A time glass mounted for regenerative movement, and a horological instrument having timed moving parts connected to the time glass for repeated regenerative movement of the time glass.

2. A horological instrument and a time glass respectively mounted for periodical demonstrative indication of an elapsed period of time, said horological instrument having a cam connected thereto for movement in a succession of cycles in initiation and completion of each said period of time, an electrically motorized apparatus connected to the time glass for regenerative movement upon energization thereof, said apparatus having an electrically operable interlocking device positioned to prevent regenerative movement of the time glass when the interlocking device is not energized, and a switch and switch controlled circuit for said electrically motorized apparatus and said device, said switch being positioned and connected for response to said cam.

3. A horological instrument having a cam equipped shaft rotatable in a predetermined period of time; a cam mounted to said shaft and having a high point and a low point for actaution of a cam follower; a normally open switch having an actuator positioned to be actuated by said cam follower whereby to close the switch prior to the transverse by the cam follower of the point of the cam at which the cam follower changes direction; a time glass mounted for regenerative movement upon an electrically motivatable member; said member having interlock means positioned for normal interlock except when electrically energized; electrically energizable means for release of the interlock means; said normally open switch, said electrically motivatable member and said electrically energizable means having circuit means electrically energizable in response to the cam operated switch.

4. The horological instrument of claim 3 wherein said circuit is provided with a holding switch and a holding circuit for said electrically motivatable member, said holding switch having an actuator positioned for actuation by said interlock means to complete the circuit only when the interlock means is released.

5. A horological instrument having a movement for operation thereof and a set of hands for visual indication of passage of time; said hands and movement being connected for friction drive of the hands; a hand setting device moveable into position for adjustment of the hands independently of the movement; an electric shut off switch positioned and connected for shut off when the hand setting device is moved into hand setting position; a master control means operably connected to the movement and including a master switch closeable at predetermined intervals for a short period of time; a time glass mounted for regenerative movement; electrically operable means connected to the time glass to regeneratively move the time glass, said means having electrically operable interlock means normally positioned to prevent movement of the time glass and energizable electrically to move to release the time glass for regeneration; a holding switch connected mechanically to the interlock means whereby to close the holding switch during release of the interlock means; an electric circuit including the electrically operable means for regeneration of the time glass, the master switch, and the interlock means.

6. The instrument of claim 5 wherein said master control means is provided with means permitting operation thereof in only one direction.

7. A time glass, time glass regenerative movement motivating means, a motion transmitting connection between the time glass and the said motivating means, means interlocking said connection against motion transmission from the motivating means to the time glass, a horological instrument and means connecting the horological instrument and the interlock means to periodically release said interlock for regeneration of the time glass by said motivating means in response to time intervals measured by said horological instrument.

References Cited in the file of this patent
UNITED STATES PATENTS

| | | |
|---|---|---|
| 1,877,732 | Dreyfuss | Sept. 13, 1932 |
| 2,078,136 | Gumm | Apr. 20, 1937 |